(12) United States Patent
George

(10) Patent No.: US 7,627,509 B2
(45) Date of Patent: Dec. 1, 2009

(54) HOME OWNERSHIP PAYMENT SYSTEM AND METHOD

(75) Inventor: Christopher M. George, San Ramon, CA (US)

(73) Assignee: CMG Financial Services, Inc., San Ramon, CA (US)

( * ) Notice: Subject to any disclaimer, the term of this patent is extended or adjusted under 35 U.S.C. 154(b) by 118 days.

(21) Appl. No.: 11/381,303

(22) Filed: May 2, 2006

(65) Prior Publication Data

US 2007/0011084 A1 Jan. 11, 2007

Related U.S. Application Data

(60) Provisional application No. 60/697,493, filed on Jul. 7, 2005.

(51) Int. Cl.
*G06Q 40/00* (2006.01)
(52) U.S. Cl. .......................................... 705/35; 705/36
(58) Field of Classification Search .............. 705/35–36
See application file for complete search history.

(56) References Cited

U.S. PATENT DOCUMENTS

| 5,206,803 | A | 4/1993 | Vitagliano et al. |
|---|---|---|---|
| 5,866,889 | A | 2/1999 | Weiss et al. |
| 5,911,136 | A | 6/1999 | Atkins |
| 6,397,196 | B1 | 5/2002 | Kravetz et al. |
| 2002/0082987 | A1 | 6/2002 | Wilson |
| 2002/0147677 | A1 | 10/2002 | Brady |
| 2002/0198825 | A1 | 12/2002 | Jentoft |
| 2003/0149656 | A1* | 8/2003 | Magruder et al. ............. 705/38 |
| 2004/0015438 | A1 | 1/2004 | Compiano et al. |
| 2004/0088248 | A1 | 5/2004 | Cutler |
| 2004/0111370 | A1 | 6/2004 | Saylors et al. |
| 2004/0225545 | A1 | 11/2004 | Turner et al. |
| 2005/0027654 | A1 | 2/2005 | Adrian |
| 2005/0049950 | A1 | 3/2005 | Johnson |
| 2005/0060257 | A1* | 3/2005 | Fry ............................ 705/38 |

* cited by examiner

*Primary Examiner*—Thu Thao Havan
(74) *Attorney, Agent, or Firm*—Greenberg Traurig, LLP

(57) ABSTRACT

A system and method for providing a line of credit to a mortgagee, while simultaneously paying off the mortgage loan of the mortgagee, by setting up an integrated account comprised of funds periodically deposited therein by the mortgagee with mortgage payment means associated with the account for paying the mortgage. The account provides a line of credit to the mortgagee based on the equity the mortgagee has in the predetermined value of the property covered by the mortgage, and means are provided for withdrawal of funds from the account by the mortgagee.

11 Claims, 1 Drawing Sheet

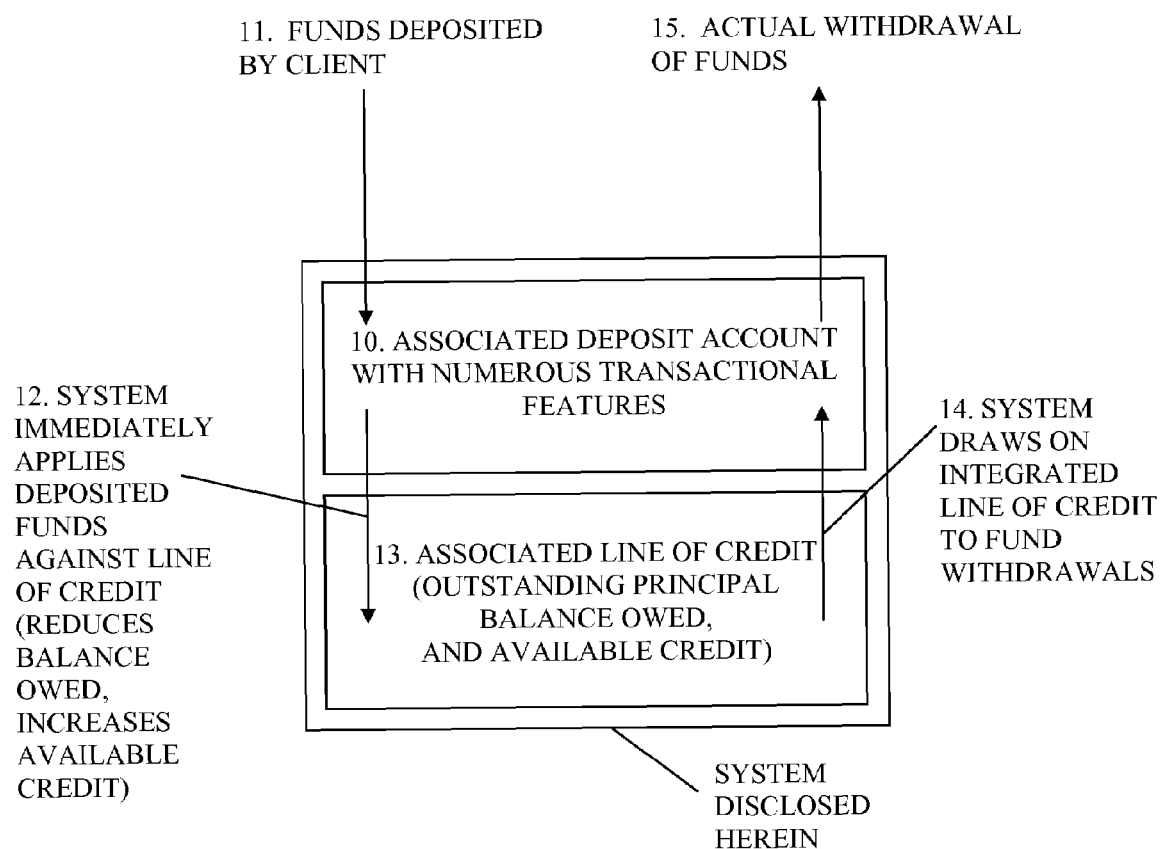

HOME OWNERSHIP PAYMENT SYSTEM AND METHOD

RELATED APPLICATION

This application claims the benefit of and priority to U.S. Provisional Application Ser. No. 60/697,493, filed Jul. 7, 2005, the content of which is incorporated by reference herein in its entirety.

BACKGROUND OF THE DISCLOSURE

1. Field of the Disclosure

The disclosure relates to a system and method for accelerating mortgage payoff on a home mortgage in a program and simultaneously providing a line of credit together with an integrated deposit account for the mortgagee in the same program.

2. General Background

Various types of payment plans for paying one's home mortgage and having a line of credit, such as an equity loan, are known. These plans are basically lending and repayment plans. However, no plans are known which replaces one's home mortgage and the mortgagee's checking account and which maintains all of the various types of transactions offered by a checking account throughout such integration.

There is a need for such a system which reduces a mortgagee's loan principal balance while providing the mortgagee with a line of credit and full, integrated access to those funds in the same manner to which they are accustomed via traditional checking accounts. Such a system would also allow a mortgagee's cash to work harder when not using it.

SUMMARY

It is an object of this invention to replace a homeowner's home mortgage and the mortgagee's checking account so as to pay down the mortgage while providing the mortgagee with a line of credit with full access to funds via a deposit account that is integrated with the line of credit.

It is a further object of this invention to accelerate the payoff of one's loan principal balance and at the same time increasing one's available credit.

The foregoing objects are carried out without need for the mortgagee to change his or her spending habits. The system involves depositing the mortgagee's paycheck or other moneys into an account which then reduces the principal balance outstanding on the loan by a corresponding amount. The account provides a line of credit for the mortgagee and as the outstanding loan balance is reduced, the amount of credit available increases correspondingly. The mortgagee always has access to these funds through either an ATM card, point-of-sale card, electronically, by online bill-payment, or by personal check written on the line of credit account or other means. Online access to this account may also be provided.

The mortgage loan principal balance is immediately reduced until the funds in the account are needed for expenses. Because interest on the principal balance on the line of credit is computed based on daily balance, and because the daily balance can be reduced by income flowing into the account, interest is saved, leaving more income for paying down principal. Therefore, the mortgage loan is paid off more quickly.

BRIEF DESCRIPTION OF THE DRAWINGS

The above-mentioned features and objects of the present disclosure will become more apparent with reference to the following description taken in conjunction with the accompanying drawing wherein like reference numerals denote like elements and in which:

FIG. 1 is a diagrammatic view of the program disclosed herein.

DESCRIPTION OF THE PREFERRED EMBODIMENT

The system disclosed herein provides for the accelerating payment of one's mortgage simultaneously with establishment of a line of credit plus integrated checking account for the mortgagee (hereinafter "client").

The system sets up an account 10 (FIG. 1) into which the client deposits his or her payroll checks or moneys from any source 11. The client may, of course, deposit funds from a source other than his or her payroll, such as his or her partner. Such check can be deposited automatically through the client's employer, electronically through a bank Automated Clearing House system (ACH), by wire, or by mail.

These funds are immediately applied to the balance owed on the client's mortgage (see 12.) thus reducing the loan's principal balance (see 13.). Since the loan's principal balance is reduced, the amount of available credit is increased correspondingly. The system automatically draws upon this available credit (see 14.), up to the client's maximum credit line amount, whenever the client makes withdrawals (see 15.) from the integrated deposit account for any reason, whether by personal check, ATM withdrawals, point-of-sale withdrawals, online bill-payments, etc. Online access to the account by the client may also be made available.

Each month, interest on the loan balance is computed and charged to the client based on daily principal balances and the interest rate in effect during the month. Thus, until the client withdraws from the account, the daily principal balance of the mortgage is less, possibly saving the client thousands of dollars in interest.

Since mortgage interest is traditionally much higher than the interest one would earn in a typical low-interest-bearing bank account, there is a considerable savings to the client. Since less of the client's money is consumed by interest, more of the client's funds go toward paying down the principal. A client with a typical income and good cash flow can pay off an average-sized mortgage loan in as little as 15 years, or even less, without any changes in the client's spending habits.

As mentioned, the client always has full access to the funds in his or her account up to the client's credit line as determined by the equity available. These funds can be used for any purpose, such as buying a car, paying taxes, paying tuition, etc. In the meantime, until there is a need for the client to withdraw funds, the money in the account is working every day to save the client interest which, of course, leaves more income available to the client to pay down the principal.

It can be seen that there is disclosed a unique system for accelerating one's mortgage payoff allowing the mortgagee to own his or her home free and clear in approximately half the time of a traditional loan. At the same time, thousands of dollars in interest are saved and the mortgagee has full access to available home equity under the credit line agreement. Such equity builds up faster, and is thus available to the mortgagee for any desired needs, such as college tuition and costs, medical and other emergencies, investment opportunities, etc.

The system disclosed herein is unique in that it improves the efficiency of a client's finances, because instead of earning a low rate of interest in a traditional bank account, their money can offset mortgage interest at a much higher rate, saving thousands of dollars in interest, and serving as a platform for reducing debt faster, or as a platform for investing in higher return opportunities. The system disclosed herein is also unique in that no other loan product available today allows for fully integrated and fully transactional checking account features (direct deposit, electronic transfers, unlimited checking, ATM access, point-of-sale access, online bill-payment, online account access, etc) which are critical to maximizing the amount of unused cash that one can apply to reduce one's loan balance and save interest. It is also important to note that without these fully-integrated features, the mortgagee would have to keep cash elsewhere (in other low-interest bearing accounts) in order to pay bills, visit ATM machines, etc, which means less cash is working to keep their loan balance lower.

Another advantage over a regular mortgage is that if one makes additional principal payments to the regular mortgage, the mortgagee cannot get those funds back unless they open a second loan, such as a HELOC, a type of home equity line of credit which usually carries a higher maximum interest rate, requires minimum withdrawals, has lower maximum loan amounts, and has no integrated checking account features such as bill-payment, online transfers, etc.

EXAMPLE

In this example, a client has a gross income of $100,000, saving 20% of his or her net income after expenses. If this client has a mortgage loan in the amount of $400,000, he or she can pay it off in 14.8 years and save over $240,000 (50%) in interest (average APR 7.3% for this example only), compared to a 30-year loan at 6.25%. This is even assuming the LIBOR Index (the London Interbank Offered Rate Index—an average of the interest rates that major international banks change each other to borrow U.S. dollars in the London money market) climbs in a "reverse course" that mirrors its recent decline. In fact, in this example, the client would have to be able to secure a jumbo 30-year fixed-rate mortgage at 3.4% to pay as little interest as in the system disclosed herein. And, in this example, the adjustable rate in the system disclosed herein would have to average 12.7% over the course of the loan for the interest payments to equal that of a 30-year fixed-rate mortgage at 6.25%, all without any change in the client's spending habits.

In a copending application, commonly assigned, entitled Interactive Simulator for Calculating the Payoff of a Home Mortgage While Providing a Line of Credit and Integrated Deposit Account, filed concurrently herewith, the teaching of which are incorporated herein, there is disclosed a computer program that can be accessed online or through a computerized storage medium, as a CD ROM, or other media, for inputting a client's mortgage loan and financial information, and computing the loan payoff time and interest expenses that would be encountered by the client.

Thus, the client's current income, debts, and living expenses are input, as, for example, on a monthly basis, and the amount of money that can be deposited into the system disclosed herein is determined. With this information, the payoff time and interest paid on a mortgage can be computed and compared to the client's existing mortgage and any one of several comparison loans that can be selected. Unlimited interest rate trend assumptions can be inputted.

Equity, as used herein, is defined as the difference between the mortgagee's loan balance at any time and the market value of the mortgaged property. Of course, the market value of the property may change over the time of the transaction described herein.

Although a particular embodiment of the invention is disclosed, variations thereof may occur to an artisan, and the scope of the invention should only be considered in conjunction with the scope of the appended claims.

The invention claimed is:

1. A system for providing an integrated line of credit mortgage account and checking account to a mortgagor, while simultaneously paying off the mortgage loan balance of the mortgagor, comprising:

an integrated account consisting of a line of credit mortgage having a line of credit account balance and integrated with a dedicated checking account having a checking account balance independent of said line of credit account balance comprised of funds periodically deposited therein by said mortgagor;

mortgage payment means associated with the integrated account paying down the mortgage balance of said mortgagor upon depositing of funds into said integrated account therein to debit the checking account balance by the amount of funds automatically moved and crediting the line of credit account balance;

said integrated account providing both a line of credit account, secured by the mortgagor's property and based on the equity said mortgagor has in the predetermined value of the mortgagor's property, and an integrated checking account to said mortgagor with said integrated account providing for said funds to be deposited into said checking account of said integrated account;

said integrated account having means for moving said funds simultaneously and automatically from said checking account into said line of credit account of said integrated account after the depositing of said funds into said checking account;

means associated with both said line of credit account and said checking account allowing withdrawal of funds from said integrated account by said mortgagor in order to pay other living expenses by automatically transferring funds from said line of credit account to said checking account to fund withdrawals or debits from said checking account to credit checking account balance and debit the line of credit account balance by said transfer amount.

2. In the system of claim 1, wherein said line of credit account has a limit and said means for allowing withdrawal of funds includes funds withdrawal limiting means for allowing said withdrawal from said line of credit account up to said line of credit limit.

3. A method for providing the payoff of a loan of a mortgage holder in an expedited manner comprising the steps of:

setting up an integrated account, consisting of a line of credit mortgage integrated with a dedicated checking account;

paying down the mortgage balance of said mortgage holder with funds periodically deposited into said integrated account by said mortgage holder;

providing both a line of credit and a checking account to said mortgage holder based on the equity said mortgage holder has in the predetermined value of the property covered by the mortgage of said mortgage holder;

providing for funds to be deposited into said checking account of said integrated account;

moving said funds simultaneously from said checking account into said line of credit portion of said integrated account after the depositing of said funds into said checking account; and providing means associated with said integrated account for the withdrawal of funds from said integrated account by said mortgage holder by transferring funds from said line of credit account portion of said integrated account to said checking account portion to fund said withdrawals.

4. The method of claim 3, wherein the step of providing means for the withdrawal of funds includes the step of providing means for the withdrawal of funds up to the line of credit of said account.

5. The method of claim 4, including the step of determining the amount of money that would be saved by said mortgage holder in paying down said mortgage in an expedited manner prior to depositing funds into the said integrated account.

6. The method of claim 5, wherein the step of determining the amount of money includes the step of factoring in the current monthly income of said mortgage holder, the anticipated monthly debts other than said mortgage of said mortgage holder, and miscellaneous other monthly expenses anticipated by said mortgage holder to determine the approximate amount of money that would be saved by said mortgage holder on a monthly basis compared to other popular mortgage financing approaches.

7. The system of claim 1 including interest payment means associated with said integrated account for paying off the interest incurred on said mortgage balance automatically from the line of credit account of said integrated account.

8. The system of claim 7 wherein said interest payment means includes means for increasing the balance of said line of credit in said line of credit account to automatically pay off said interest due.

9. The method of claim 3 including the step of paying off the interest incurred on said mortgage balance automatically from line of credit portion of said integrated account.

10. The method of claim 9 including the step of increasing the balance of said credit line to pay off said interest.

11. A system for providing a checking account and an integrated line of credit account to a mortgagor, comprising:

an integrated account consisting of a line of credit mortgage account loan with a dedicated checking account comprised of funds periodically deposited therein by said mortgagor;

said line of credit mortgage account loan secured by a property of the mortgagor and having a line of credit account balance based on the equity said mortgagor has in the predetermined value of the mortgagor's property;

said dedicated checking account having a checking account balance independent of said line of credit account balance and receiving funds deposited into said integrated account;

mortgage payment means associated with the integrated account paying down the line of credit mortgage loan balance of said mortgagor automatically upon depositing of funds into said integrated checking account therein by transferring the deposited funds from the checking account to the line of credit mortgage account to debit the checking account balance by the amount of funds automatically moved and crediting the line of credit account balance;

fund withdrawal means associated with the integrated account for paying other living expenses by automatically transferring funds from said line of credit account to said checking account to fund withdrawals or debits from said checking account other than to pay down said line of credit mortgage account to credit the checking account balance and debit the line of credit account balance by said transfer amount.

* * * * *

UNITED STATES PATENT AND TRADEMARK OFFICE
CERTIFICATE OF CORRECTION

PATENT NO. : 7,627,509 B2  Page 1 of 1
APPLICATION NO. : 11/381303
DATED : December 1, 2009
INVENTOR(S) : Christopher M. George It is certified that error appears in the above-identified patent and that said Letters Patent is hereby corrected as shown below:

Col. 4 line 7, line 15, lines 16-18, line 26, line 36
The word "mortgagor" should be changed to "mortgagee" in Claims 1 and 11.

Col. 6 lines 8, 9, 10, and 17
Delete all Ref. to word "mortgagor".

Signed and Sealed this

Thirtieth Day of March, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,627,509 B2 | Page 1 of 1 |
| APPLICATION NO. | : 11/381303 | |
| DATED | : December 1, 2009 | |
| INVENTOR(S) | : Christopher M. George | |

It is certified that error appears in the above-identified patent and that said Letters Patent is hereby corrected as shown below:

Col. 4, lines 7, 9, 15, 17-18, 23-26, Claim 1
The word "mortgagor" should be changed to "mortgagee"

Col. 6, lines 2, 6, 8-10, and 17, Claim 11
Delete all Ref. to word "mortgagor".

This certificate supersedes the Certificate of Correction issued March 30, 2010.

Signed and Sealed this
Eleventh Day of December, 2012

David J. Kappos
*Director of the United States Patent and Trademark Office*